US011514703B2

(12) United States Patent
Oya (10) Patent No.: US 11,514,703 B2
(45) Date of Patent: Nov. 29, 2022

(54) DETECTION DEVICE AND CONTROL METHOD OF THE SAME (71) Applicant: CANON KABUSHIKI KAISHA, Tokyo (JP)

(72) Inventor: Takashi Oya, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 192 days.

(21) Appl. No.: 16/531,539

(22) Filed: Aug. 5, 2019

(65) Prior Publication Data

US 2020/0050843 A1   Feb. 13, 2020

(30) Foreign Application Priority Data

Aug. 7, 2018 (JP) ............................. JP2018-148854
Apr. 25, 2019 (JP) ............................. JP2019-084436

(51) Int. Cl.
G06V 40/10 (2022.01)
G06V 20/58 (2022.01)

(52) U.S. Cl.
CPC ............ G06V 40/103 (2022.01); G06V 20/58 (2022.01)

(58) Field of Classification Search
USPC ................................................. 382/100, 104
See application file for complete search history.

(56) References Cited

U.S. PATENT DOCUMENTS

| 10,534,819 | B2* | 1/2020 | Ricci | G01S 19/42 |
| 11,068,706 | B2* | 7/2021 | Adachi | H04N 7/188 |
| 11,341,773 | B2* | 5/2022 | Hamana | G06T 7/20 |
| 2005/0105765 | A1* | 5/2005 | Han | G08B 13/19615 382/100 |
| 2007/0237387 | A1* | 10/2007 | Avidan | G06V 10/507 382/103 |
| 2014/0306799 | A1* | 10/2014 | Ricci | G01C 21/26 340/5.83 |
| 2015/0146919 | A1* | 5/2015 | Ryu | G06V 20/588 382/103 |
| 2015/0294144 | A1* | 10/2015 | Konishi | G06K 9/00255 382/103 |

FOREIGN PATENT DOCUMENTS

| JP | H0950585 A | 2/1997 |
| JP | 2006027481 A | 2/2006 |
| JP | 2014006700 A | 1/2014 |
| JP | 2014229010 A | 12/2014 |

* cited by examiner

Primary Examiner — Ishrat I Sherali
(74) Attorney, Agent, or Firm — Carter, DeLuca & Farrell LLP (57) ABSTRACT In order to detect an object by discriminating the object in accordance with the state of the object, a detection device comprises: a detection unit configured to detect a plurality of portions of an object contained in a frame image of a moving image; an intrusion determination unit configured to determine that the object has intruded into a preset area of the frame image; and a determination unit configured to determine whether to notify a determination result of the intrusion determination unit, in accordance with whether portions detected by the detection unit include a predetermined portion.

12 Claims, 7 Drawing Sheets

| FACE | HEAD | HALF BODY | WHOLE BODY | DETERMINATION |
|---|---|---|---|---|
| × | × | × | × | UNKNOWN |
| ○ | × | × | × | DRIVER |
| × | ○ | × | × | DRIVER |
| ○ | ○ | × | × | DRIVER |
| — | — | ○ | × | UNKNOWN |
| — | — | × | ○ | PEDESTRIAN |
| — | — | ○ | ○ | PEDESTRIAN |

DETECTION DEVICE AND CONTROL METHOD OF THE SAME

BACKGROUND OF THE INVENTION

Field of the Invention

The present invention relates to a technique of detecting an object contained in a video.

Description of the Related Art

To secure the safety of facilities such as an apartment, a building, a schoolhouse, a station building, and an airport, a system in which a monitoring camera is installed and the intrusion of a person into the facility is detected by analyzing a video obtained by the monitoring camera has been introduced. US-2007-0237387 discloses a technique of detecting a human body by cascade-connecting strong discriminators for detecting a portion of the body, in regard to detection of a human body region in a video. Also, Japanese Patent Laid-Open No. 9-50585 discloses an intruder monitoring apparatus for determining whether a person has intruded into an inhibited area on an image.

Figure 1:
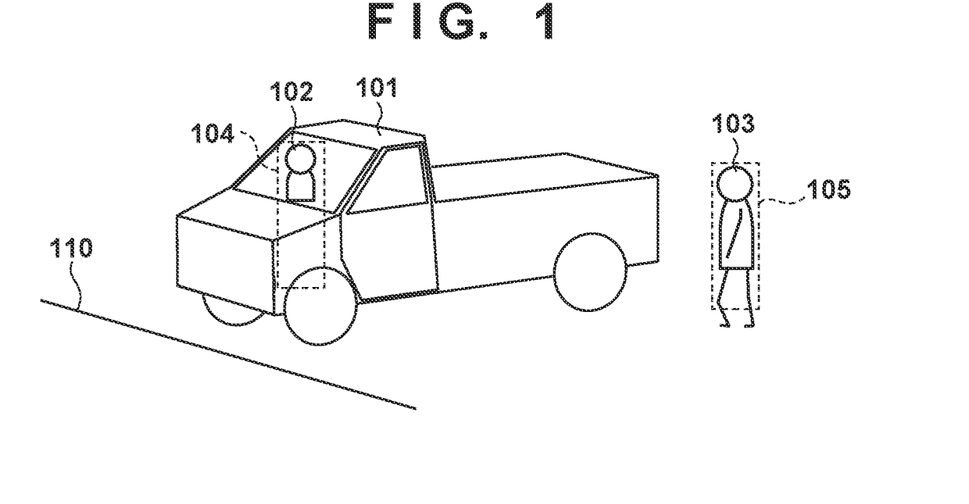
FIG. 1 is a view for explaining an example of intrusion detection.

In the above-described techniques, a human body contained in a video is detected without discriminating the state of the human body. When a video as shown in FIG. 1 is obtained by a camera, therefore, a human body (driver 102) in a vehicle and a human body (pedestrian 103) walking on a street are detected. For example, it is determined that human bodies are detected in broken-line rectangles 104 and 105, and tracking is started. Then, a warning indicating the detection of an intruder is output by using, as a trigger, an event in which, for example, the human body currently being tracked passes an intrusion detection line 110. That is, it is impossible to cope with a use case in which the entrance of a vehicle needs to be excluded from detection targets (=a human body in a vehicle needs to be excluded from detection targets).

SUMMARY OF THE INVENTION

According to one aspect of the present invention, a detection device comprises: a detection unit configured to detect a plurality of portions of an object contained in a frame image of a moving image; an intrusion determination unit configured to determine that the object has intruded into a preset area of the frame image; and a determination unit configured to determine whether to notify a determination result of the intrusion determination unit, in accordance with whether portions detected by the detection unit include a predetermined portion.

According to another aspect of the present invention, a detection device comprises: a detection unit configured to detect a plurality of portions of an object contained in a frame image of a moving image; and a determination unit configured to determine whether the object is a pedestrian or a passenger of a vehicle, in accordance with whether portions detected by the detection unit include a predetermined portion.

The present invention makes it possible to detect an object by discriminating the object in accordance with the state of the object.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Examples of embodiments of the present invention will be explained in detail below with reference to the accompanying drawings. Note that the following embodiments are merely examples, and are not intended to limit the scope of the present invention.

First Embodiment

The first embodiment of a detection device according to the present invention will be explained below by taking, as an example, a detection system including a camera for imaging a predetermined monitoring area, and a detection device for detecting an object in a moving image obtained by the camera. A human body is assumed as an object to be detected in the following explanation, but the object to be detected may also be another object.

<System Configuration>

Figure 4:
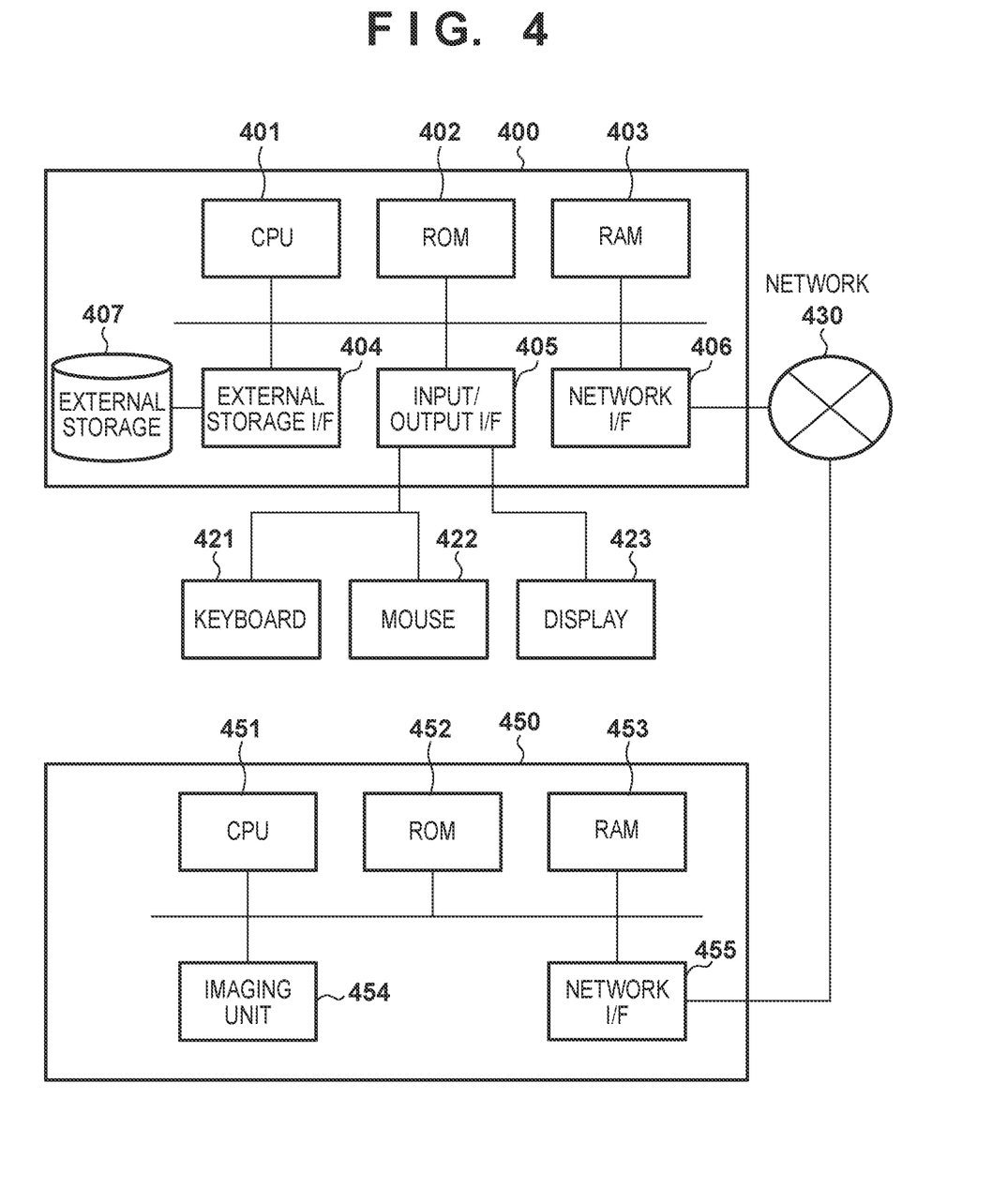
FIG. 4 is a view exemplarily showing the hardware configuration of a detection system.

FIG. 4 is a view exemplarily showing the hardware configuration of the detection system. As described above, the detection system includes a detection device 400 and a camera 450. Note that the detection device 400 receives a video from one camera 450 across a network 430 in FIG. 4, but may also receive videos from a plurality of cameras. In addition, the detection device 400 can also incorporate a camera and directly obtain a video without using the network 430.

The detection device 400 includes a CPU 401, a ROM 402, a RAM 403, an external storage I/F 404, an input/output I/F 405, and a network I/F 406. The ROM 402 stores programs to be executed by the CPU 401 and various kinds of setting data. The CPU 401 reads out the programs stored in the ROM 402 to the RAM 403 and executes them, thereby implementing functional units to be described later with reference to FIG. 5.

The external storage I/F 404 is an interface for connecting an external storage device 407 such as a hard disk drive (HDD). The input/output I/F 405 is an interface for connecting to input devices such as a keyboard 421, a mouse 422, and a touch panel (not shown), and an output device such as a display 423. The network I/F 406 is an interface for communicating with an external apparatus such as the camera 450 by connecting to the network 430. The detection device 400 can be implemented by, for example, a versatile PC (Personal Computer), a smartphone, or a tablet, and does not depend on any specific device form.

The camera 450 includes a CPU 451, a ROM 452, a RAM 453, an imaging unit 454, and a network I/F 455. The ROM 452 stores programs to be executed by the CPU 451 and various kinds of setting data. The CPU 451 reads out the programs stored in the ROM 452 to the RAM 453 and executes them, thereby implementing an imaging process to be performed by the imaging unit 454 and a communication process to be performed by the network I/F 455. The imaging unit 454 includes an imaging optical system and an imaging element such as a CCD or a CMOS, and generates a moving image (a plurality of frame images) by imaging. The imaging unit 454 may also perform compression encoding or the like.

Figure 5:
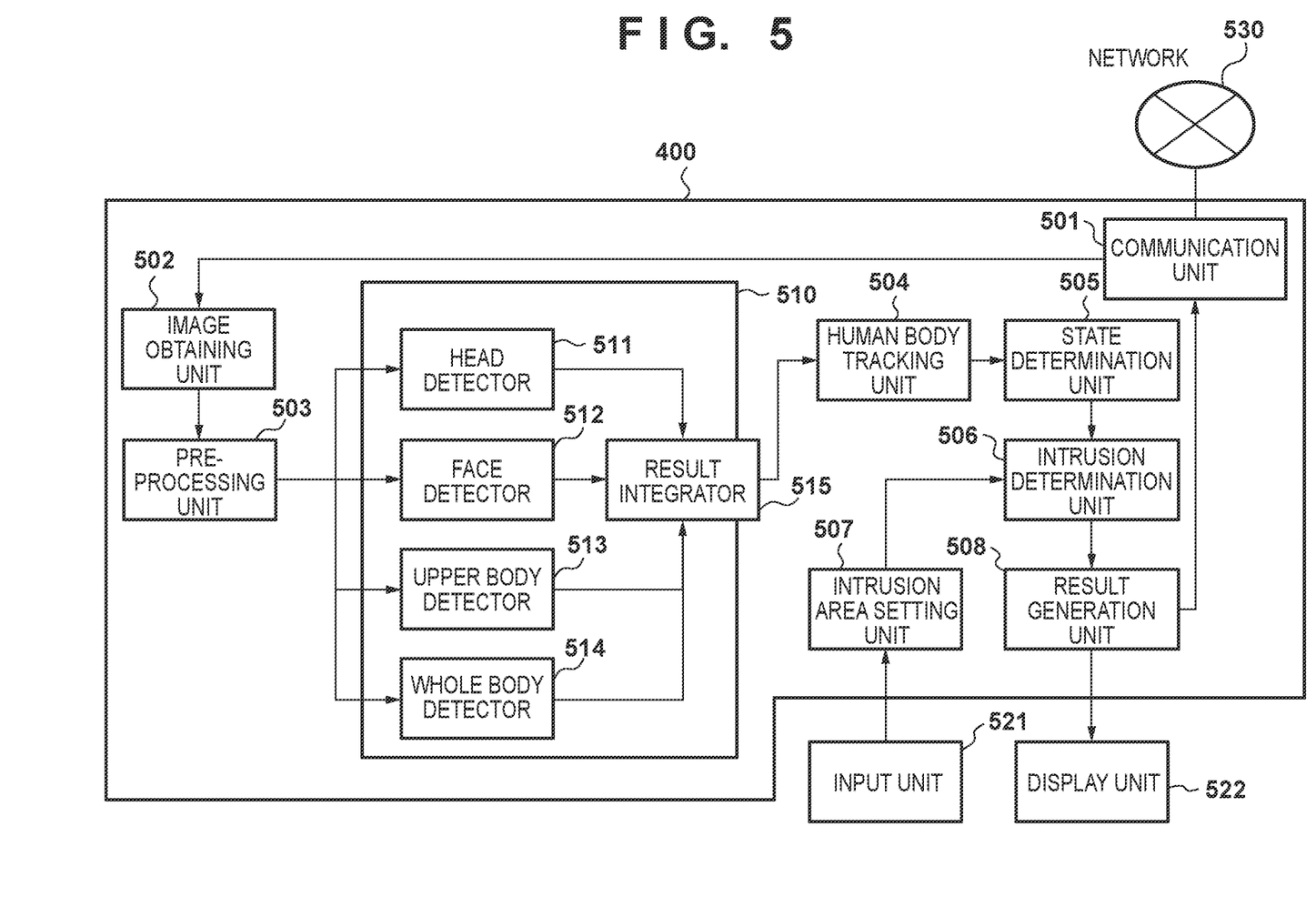
FIG. 5 is a view exemplarily showing the functional configuration of a detection device.

FIG. 5 is a view exemplarily showing the functional configuration of the detection device. As functional units, the detection device 400 includes a communication unit 501, an image obtaining unit 502, a pre-processing unit 503, a human body detection unit 510, a human body tracking unit 504, a state determination unit 505, an intrusion determination unit 506, a result generation unit 508, and an area setting unit 507. The human body detection unit 510 incudes a plurality of detectors for detecting different target portions (a head detector 511, a face detector 512, an upper body detector 513, and a whole body detector 514), and a result integrator 515.

The communication unit 501 executes communication with an external apparatus across the network 530. For example, the communication unit 501 receives a compression-encoded moving image from the camera 450. The image obtaining unit 502 decodes the obtained moving image, and stores the image as, for example, a plurality of frame images in the external storage device 407. The pre-processing unit 503 corrects the frame image so as to facilitate extracting a feature amount.

The human body detection unit 510 detects a human body contained in the frame image. More specifically, the human body detection unit 510 detects a human body by executing a detection process in each of the head detector 511, the face detector 512, the upper body detector 513, and the whole body detector 514, and integrating the detection results by the result integrator 515. Details of the detection process will be described later with reference to FIGS. 2, 3A, and 3B.

Figure 2:
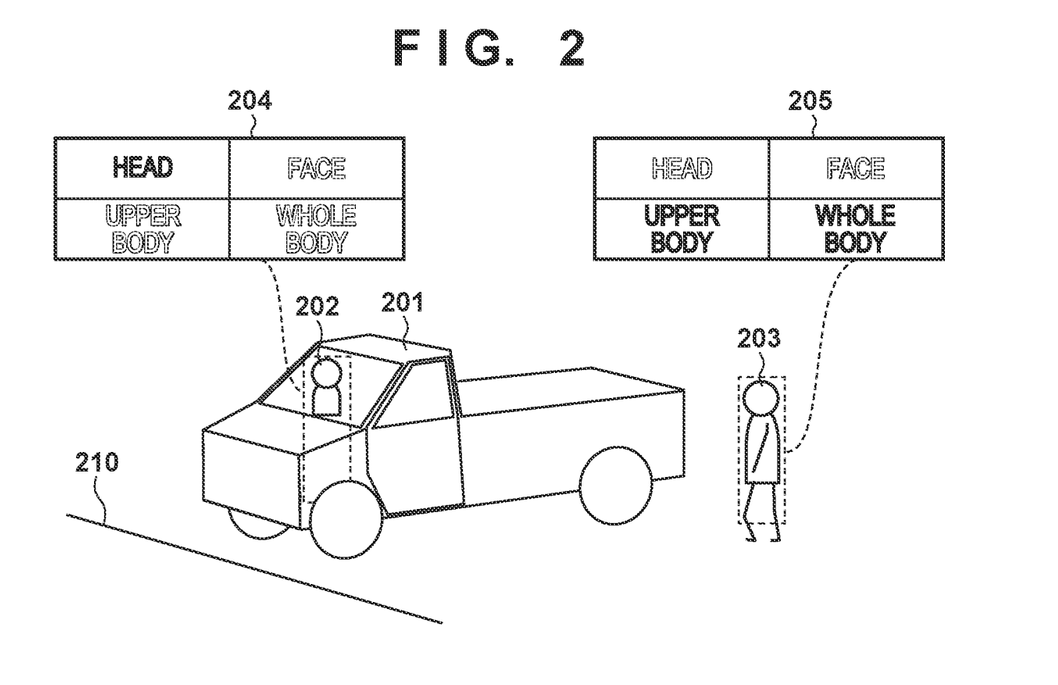
FIG. 2 is a view for explaining the principle of intrusion detection according to the first embodiment.

The human body tracking unit 504 associates figures of a human body detected by the human body detection unit 510 with each other between a plurality of frame images, thereby tracking the human body. The state determination unit 505 determines the state of the human body detected by the human body detection unit 510. In this embodiment, the state determination unit 505 determines whether the human body is a driver or a pedestrian. The area setting unit 507 sets an image area as a predetermined area in which intrusion detection is determined. In this embodiment, as shown in FIG. 2, assume that a boundary line is set as an intrusion detection line having a linear (line segment) shape in an imaging area indicated by the moving image. However, the intrusion detection line may also be set as a polyline, a curved line, or a combination thereof. It is also possible to set an intrusion detection area having an arbitrary shape. When setting an area, intrusion detection is determined under the condition that a target human body exists inside the area for a predetermined time or more.

The intrusion determination unit 506 determines the intrusion of a human body as a detection target in accordance with the setting by the area setting unit 507. The result generation unit 508 generates information of the detection result obtained by the intrusion determination unit 506, and performs alarm notification. For example, the result generation unit 508 displays a warning on the display unit 522, or notifies an external apparatus (not shown) of a warning across the network 530.

<Principle of Intrusion Detection>

FIG. 2 is a view for explaining the principle of intrusion detection according to the first embodiment. Like FIG. 1, FIG. 2 shows a state in which the camera obtains a video containing a human body (driver 202) in a vehicle 201 and a human body (pedestrian 203) walking on a street.

An intrusion detection line 210 is set in the video, and the detection device performs intrusion detection determination if a person passes the intrusion detection line 210. Portion detection information 204 and portion detection information 205 exemplarily show information indicating the detection results of four portions detected by the four discriminators included in the detection device.

In the first embodiment, the detection device determines the states of the human bodies 202 and 203 having passed the intrusion detection line 210, based on the pieces of portion detection information 204 and 205. More specifically, the detection device determines whether the human body is a driver or a pedestrian. Then, the detection device determines that the human body 202 as a driver is not an intruder, and does not perform warning notification. On the other hand, the detection device determines that the human body 203 as a pedestrian (a human body who is not a driver) is an intruder, and performs warning notification. Note that a human body in a vehicle is expressed as "a driver" in this embodiment for the sake of convenience, but the same shall apply to other vehicle passengers (human bodies in the passenger seat and rear seat).

Figure 3A:
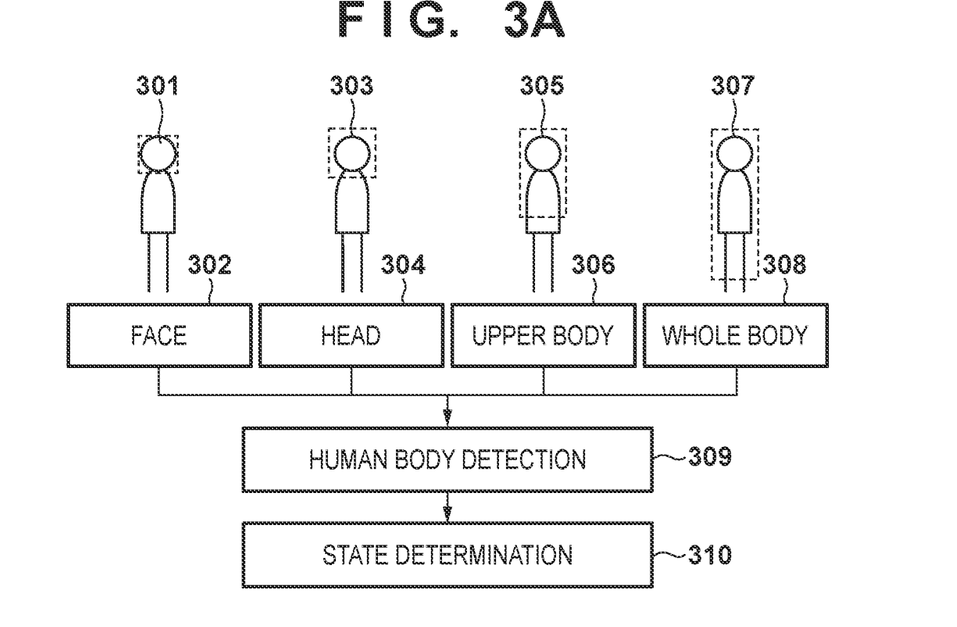
FIGS. 3A and 3B are views for explaining a human body state determination logic based on detection of a plurality of portions.
Figure 3B:
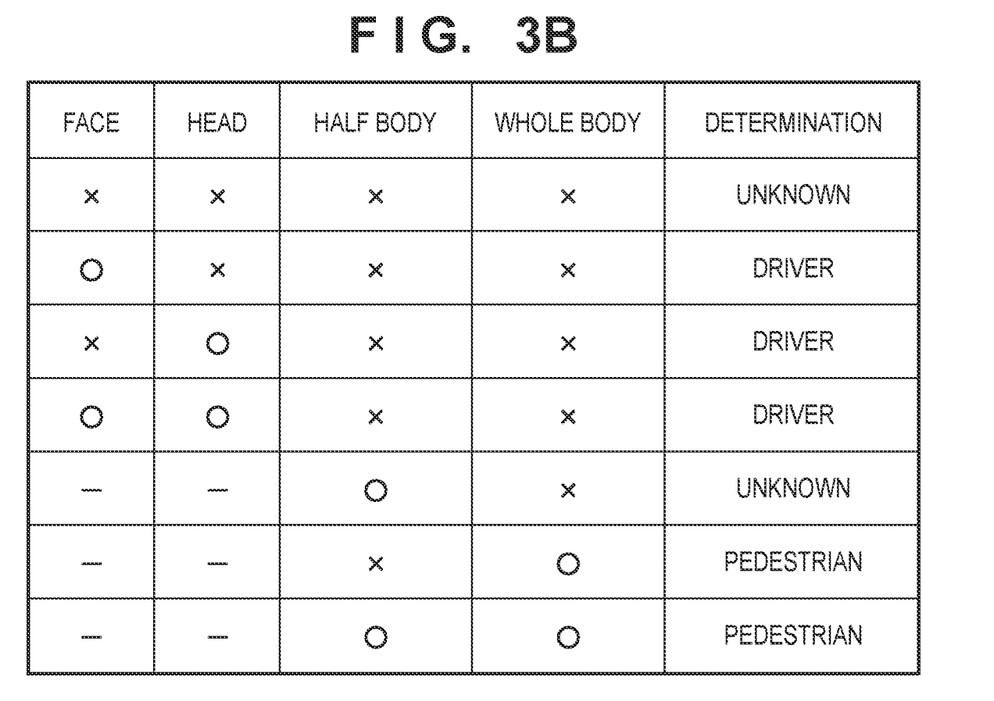

FIGS. 3A and 3B are views for explaining the human body state determination logic based on the detection of a plurality of portions. FIG. 3A shows the procedure of a human body state determination process. FIG. 3B shows a table indicating the determination results based on combination patterns of the portion detection results.

Discriminators 302, 304, 306, and 308 perform detection processes corresponding to different portions (body regions) of a human body in a frame image. The discriminators 302, 304, 306, and 308 respectively correspond to the face detector 512, the head detector 511, the upper body detector 513, and the whole body detector 514 shown in FIG. 5. That is, in the first embodiment, "a face 301", "a head 303", "an upper body 305", and "a whole body 307" are assumed as "portions".

Each discriminator (strong discriminator) is obtained by, for example, cascade-connecting a plurality of weak discriminators. The weak discriminator detects a pattern of an image feature such as the edge or the color. Note that an optimum detection pattern of an image feature can be obtained by machine learning.

In a human body detection process 309, a human body is detected based on the portion detection results obtained by the discriminators (strong discriminators). The human body detection 309 corresponds to the result integrator 515 shown in FIG. 5. Note that the detection results can be integrated by using, for example, an evaluation function using the weighted sum of the individual portions.

A state determination process 310 determines the state of the human body based on the portion detection results obtained by the discriminators (strong discriminators). In this embodiment, whether the detected human body is "a driver", "a pedestrian", or "unknown" indicating neither, is determined based on a combination pattern of the portion detection results.

For example, as shown in FIG. 3B, if at least one of the face and the head is detected in a frame image and other portions are not detected, it is determined that the human body is a driver. If the whole body is detected in a frame image, it is determined that the human body is a pedestrian. That is, a case in which the whole body is detected in a frame image is a case in which the whole human body including the lower half of the human body, which is very unlikely detected for a vehicle passenger such as a driver, is detected, so it is determined that the human body is a pedestrian. On the other hand, a case in which the whole body is not detected in a frame image is a case in which the whole human body including the lower half is not detected, so it is determined that the human body is a vehicle passenger such as a driver. Note that in the table shown in FIG. 3B, "○" indicates that the corresponding target is detected, and "×" indicates that the corresponding target is not detected. Also, "-" indicates that the presence/absence of detection does not matter (this item is not used in state determination). Note that the table shown in FIG. 3B is merely an example, and it is also possible to use a combination of other human body portions, or determine another state. Note also that two or more detectors of the above-described four detectors can be used as the plurality of detectors included in the human body detection unit 510. For example, the human body detection unit 510 includes the head detector 511 and the whole body detector 514, and the state is determined based on the detection results obtained by the two detectors. Furthermore, this embodiment includes the four detectors described above, but can further include a detector for detecting the lower half of a human body. The lower half of the human body of a vehicle passenger such as a driver is very unlikely detected in a frame image, so it is determined that the human body is a pedestrian if the detector detects the lower body. On the other hand, if the detector does not detect the lower body, it is determined that the human body is a vehicle passenger such as a driver. Examples of the detector for detecting the lower body are a detector for detecting the whole lower body below the waist, a detector for detecting a portion below the ankle, and a detector for detecting the leg.

Figure 6:
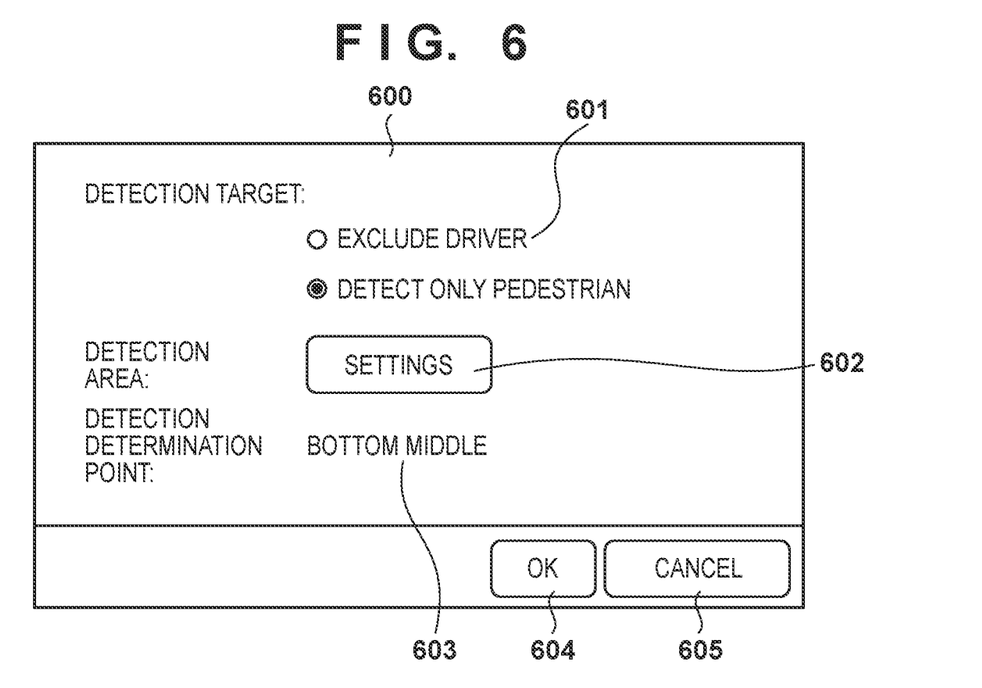
FIG. 6 is a view showing an example of a screen for setting the conditions of intrusion detection.

FIG. 6 is a view showing an example of a screen for setting the conditions of intrusion detection. Assume that the settings of a detection target, a detection area, and a detection determination point are accepted via a dialogue 600 displayed on the display 423. It is, of course, also possible to further accept other conditions. In this example, the dialogue 600 includes a radio button 601 for selecting a detection target, a setting button 602 for setting an area, and display 603 for displaying a detection determination point. The dialogue 600 also includes an OK button 604 for determining the settings, and a cancel button 605 for discarding the settings.

The radio button 601 for selecting a detection target accepts one selection from a plurality of options in accordance with a clicking operation by the mouse 422 in order to limit intrusion detection targets. For example, "exclude driver" excludes a human body found to be "a driver" from intrusion detection targets. That is, a human body found to be "a pedestrian" or "unknown" is an intrusion detection target. Also, "detect only pedestrian" excludes both a human body found to be "a driver" and a human body found to be "unknown" from intrusion detection targets.

The setting button 602 accepts the setting of an area in which intrusion detection is determined. For example, when the setting button 602 is clicked by the mouse 422, the scene shown in FIG. 2 is displayed, and a user interface (UI) for accepting changing of the intrusion detection line 210 is displayed. This UI is equivalent to the area setting unit 507 shown in FIG. 5. As described previously, it is possible to set either an intrusion detection line or an intrusion detection area. Also, the display 603 for a detection determination point indicates a detection point in the intrusion detection determination area. As the detection point, it is possible to display foot, middle, right, left, or the like.

<Operation of Device>

Figure 7:
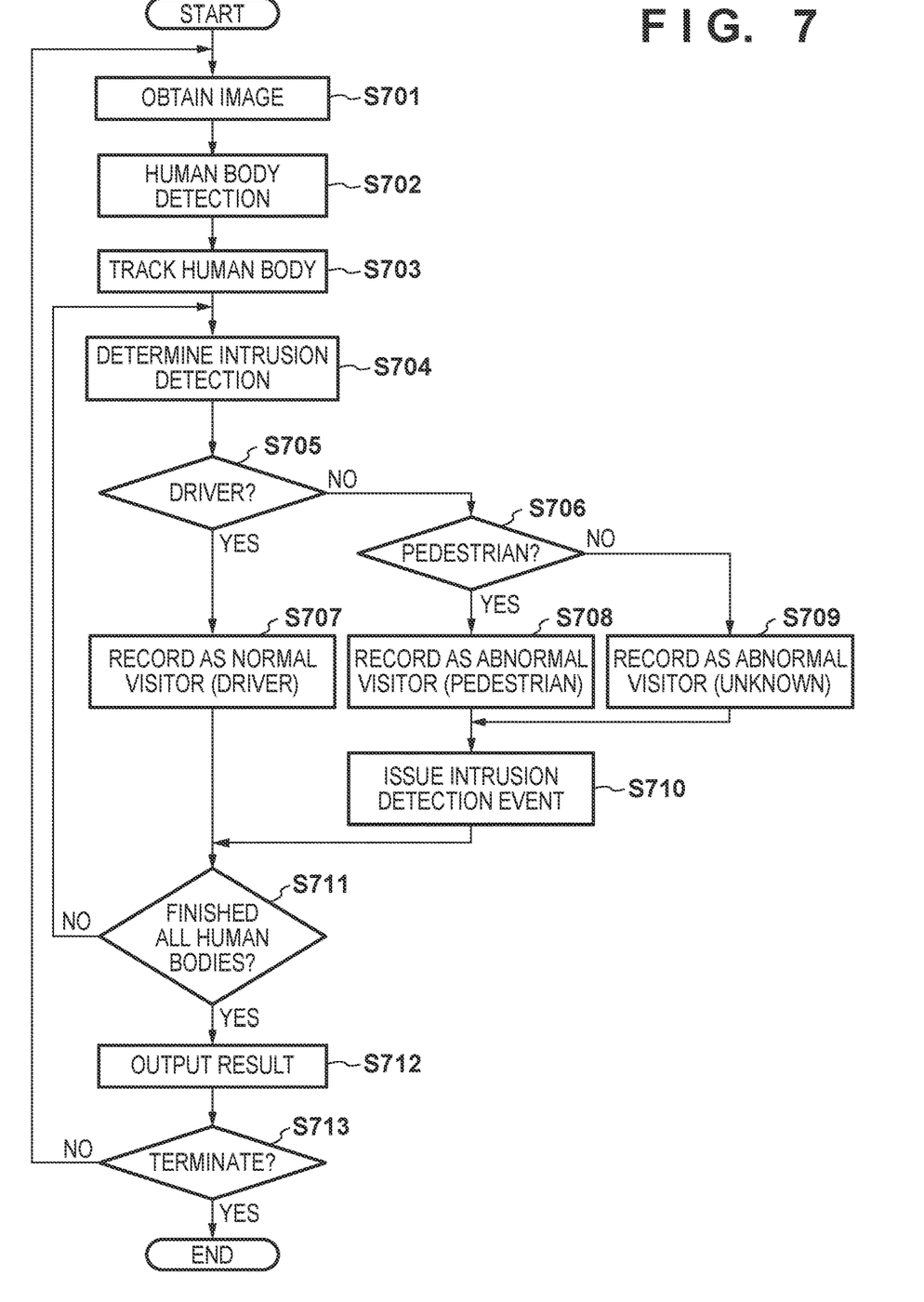
FIG. 7 is a flowchart of an intrusion detection process according to the first embodiment.

FIG. 7 is a flowchart of the intrusion detection process according to the first embodiment. As described earlier, the CPU 401 implements the functional units shown in FIG. 5 by reading out the programs stored in the ROM 402 to the RAM 403 and executing them.

In step S701, the image obtaining unit 502 obtains a moving image from the camera 450 across the network 530. Then, the image obtaining unit 502 decodes the obtained moving image, and stores the decoded image as a plurality of frame images in the external storage device 407.

In step S702, the pre-processing unit 503 corrects each frame image so as to facilitate extracting a feature amount, and the human body detection unit 510 detects a human body contained in the frame image. As described above, the four detectors 511 to 514 perform the processes of detecting the four portions (the head, face, upper body, and whole body) of the human body. Then, the result integrator 515 integrates the detection results of the four detectors, thereby detecting the human body.

In step S703, the human body tracking unit 504 tracks the human body detected by the human body detection unit 510 over the plurality of frame images. For example, the log is held by linking the detection results of the human body in the preceding (=past) frame images. Note that in the first embodiment, all human bodies detected by the human body detection unit 510 are tracked.

In step S704, the intrusion determination unit 506 determines the intrusion of a detection target human body in accordance with the setting by the area setting unit 507. For example, the intrusion determination unit 506 determines whether the moving vector of the human body crosses the intrusion detection line 210 in a predetermined direction.

In step S705, the state determination unit 505 determines the state of the human body crossing the intrusion detection line 210. More specifically, the state determination unit 505 determines whether the human body is a driver, a pedestrian, or unknown by the method explained with reference to FIGS. 3A and 3B. The process advances to step S707 if the human body is a driver, and advances to step S706 if the human body is not a driver (that is, if the human body is a pedestrian or unknown). If the human body is a pedestrian in step S706, the process advances to step S708. If the human body is not a pedestrian (that is, if the human body is unknown), the process advances to step S709.

In step S707, the intrusion determination unit 506 records that the target human body is a normal visitor. On the other hand, in step S708, the intrusion determination unit 506 records that the target human body is an abnormal visitor (pedestrian). In step S709, the intrusion determination unit 506 records that the target human body is an abnormal visitor (unknown). After recording the abnormal visitor in step S708 or S709, the intrusion determination unit 506 issues an intrusion detection event.

In step S711, the intrusion determination unit 506 determines whether the intrusion detection determination in step S704 is performed on all human bodies detected in step S702 and tracked in step S703. If there is an undetermined human body, the process returns to step S704, and the intrusion determination unit 506 performs determination on the remaining human body. If the determination on all human bodies is complete, the process advances to step S712.

In step S712, if the intrusion detection event is issued, the result generation unit 508 performs alarm notification to make the user recognize the detection of the abnormal visitor. For example, the result generation unit 508 displays a warning on the display unit 522, or notifies an external apparatus (not shown) of a warning across the network 530.

In step S713, the detection device 400 termination determination. For example, the detection device 400 terminates the process if the user inputs a termination instruction. If there is no instruction, the detection device 400 returns to step S701, and continues the process.

In the first embodiment as described above, a human body is detected based on the detection results of the plurality of detectors, and the state (a driver, a pedestrian, or unknown) of the human body is determined. Then, the issue of an intrusion detection event is controlled based on the determined state. For example, if the human body is found to be a driver, the issue of an intrusion detection event is restrained. This makes it possible to restrain, for example, alarm notification on the intrusion of a vehicle (the intrusion of a human body in the vehicle). That is, it is possible to cope with a use case in which the entrance of a vehicle needs to be excluded from detection targets.

Note that a human body is assumed as a detection target object in the above explanation, but various objects can be designated as detection target objects. That is, it is possible to designate an object that can take a plurality of states based on the detection results of a plurality of discriminators.

Second Embodiment

In the second embodiment, a form in which the processing load is reduced by reducing the number of human bodies as targets of tracking and intrusion detection will be described. More specifically, a form in which state determination is performed on detected human bodies and tracking and intrusion detection determination are performed on human bodies (a pedestrian and unknown) excluding a human body (driver) in a specific state will be explained. The principle of intrusion detection, the state determination logic, and the hardware configuration are the same as those of the first embodiment (FIGS. 2 to 4), so an explanation thereof will be omitted.

Also, the functional configuration of the second embodiment is almost the same as that of the first embodiment (FIG. 5), but the processing order is different from that of the first embodiment. More specifically, in the second embodiment, the human body tracking unit 504 and the state determination unit 505 shown in FIG. 5 are switched, so human body tracking is performed after state determination. Portions different from the first embodiment will mainly be explained below.

<Operation of Device>

Figure 8A:
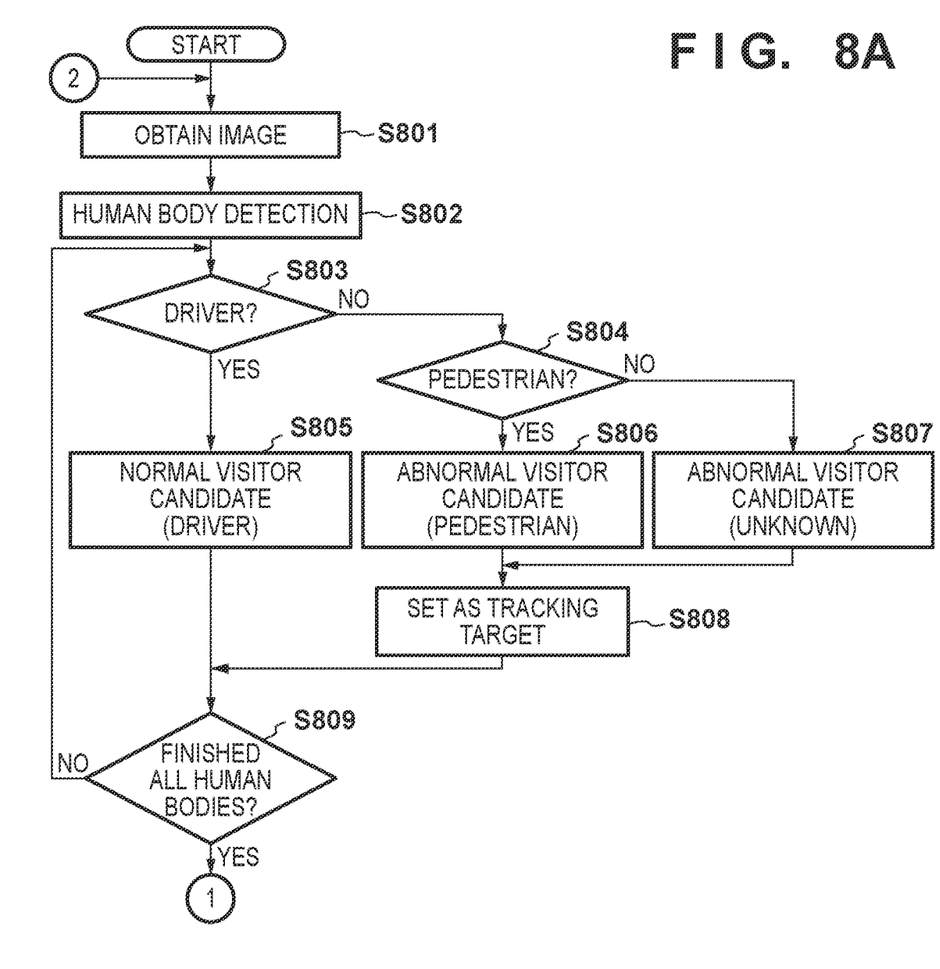
FIGS. 8A and 8B are flowcharts of an intrusion detection process according to the second embodiment.
Figure 8B:
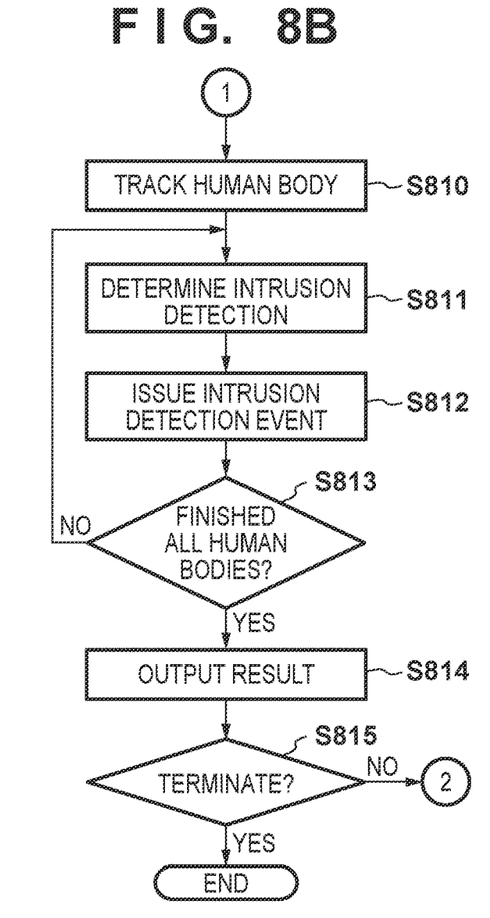

FIGS. 8A and 8B are flowcharts of an intrusion detection process according to the second embodiment. As in the first embodiment, a CPU 401 implements the functional units shown in FIG. 5 by reading programs stored in a ROM 402 to a RAM 403 and executing them.

Steps S801 and S802 are the same as steps S701 and S702 of the first embodiment. In step S803, a state determination unit 505 determines the state of a human body detected in step S802. More specifically, the state determination unit 505 determines whether the human body is a driver, a pedestrian, or unknown by using the method explained with reference to FIGS. 3A and 3B. If the human body is a driver, the process advances to step S805. If the human body is not a driver (that is, if the human body is a pedestrian or unknown), the process advances to step S804. In step S804, if the human body is a pedestrian, the process advances to step S806. If the human body is not a pedestrian (that is, if the human body is unknown), the process advances to step S807.

In step S805, the state determination unit 505 determines that the target human body is a normal visitor candidate. This is so because this human body is recorded as a normal visitor even if he or she passes an intrusion detection line 210. On the other hand, in step S806, an intrusion determination unit 506 determines that the target human body is an abnormal visitor candidate (pedestrian). Also, in step S807, the intrusion determination unit 506 determines that the target human body is an abnormal visitor candidate (unknown). Then, in step S808, the intrusion determination unit 506 sets the human body, who is recorded as an abnormal visitor candidate in step S806 or S807, as a tracking target.

In step S809, the intrusion determination unit 506 determines whether the state determination in steps S803 to S808 is performed on all human bodies detected in step S802. If there is an undetermined human body, the process returns to step S803, and determination is performed on the remaining human body. If the determination on all human bodies is complete, the process advances to step S810.

In step S810, a human body tracking unit 504 tracks the human body set as a tracking target in step S808 over a plurality of frame images. In step S811, the intrusion determination unit 506 determines the intrusion of the human body as a detection target in accordance with the settings by an area setting unit 507. In step S812, the intrusion determination unit 506 issues an intrusion detection event. This is so because all human bodies set as tracking targets in step S808 are human bodies (abnormal visitor candidates) to be recorded as abnormal visitors if they pass the intrusion detection line 210.

In step S813, the intrusion determination unit 506 determines whether the state determination in step S811 is performed on all human bodies set as tracking targets in step S808. If there is an undetermined human body, the intrusion determination unit 506 returns to step S811 and performs the determination on the remaining human body. If the determination on all human bodies set as tracking targets in step S808 is complete, the process advances to step S814. Note that steps S814 and S815 are the same as steps S712 and S713 of the first embodiment.

In the second embodiment as explained above, a detected human body to be set as a target of tracking and intrusion detection is determined based on the determination result of the state (a driver, a pedestrian, or unknown) of the human body. In the second embodiment, the number of human bodies as targets of tracking and intrusion detection determination can be reduced compared to the first embodiment. Consequently, the processing load can be suppressed. Note that a result generation unit 508 may also count human bodies found to be intrusion detection targets based on the determination result shown in FIG. 3B, and generate and output the count result.

(Modifications)

In the above-described embodiments, the state (a driver, a pedestrian, or unknown) of a human body is determined by integrating the detection results of a plurality of detectors (discriminators) for detecting different portions of the human body. On the other hand, it is also possible to install one or more detectors for detecting portions of a human body and one or more detectors for detecting portions of a vehicle, and determine the state of the human body by integrating the detection results of these detectors.

For example, it is determined that an oblong moving body region contained in a moving image is a vehicle. Then, if a human body region exists in the middle of the front portion (in the moving direction) of the vehicle region when the human body passes the intrusion detection line 210, it is determined that the human body is a driver. That is, the state of a human body can also be determined by integrating the detection results of an object other than the human body.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148854, filed Aug. 7, 2018 and Japanese Patent Application No. 2019-084436, filed Apr. 25, 2019 which are hereby incorporated by reference herein in their entirety.

What is claimed is:

1. A detection device comprising:
one or more processors; and
one or more memories storing executable instructions which, when executed by the one or more processors, cause the detection device to perform operations including:
detecting an object contained in an image;
specifying which type of a part of the detected object is detected or undetected;
determining whether or not the detected object is a person in a vehicle in accordance with a combination of the specified types of a detected part and an undetected part; and
if a type of the detected parts of the object includes a predetermined type, determining that the detected object is a pedestrian.

2. The device according to claim 1, wherein the operations further include:
notifying that the detected object has intruded into a preset area.

3. The device according to claim 2, wherein the operations further include:
accepting a setting of the preset area by one of a straight line, a curved line, and a combination thereof, each of which indicates a boundary line of the preset area.

4. The device according to claim 1, wherein the object is a human body, and predetermined type is one of a whole human body and a lower half of a human body.

5. The device according to claim 1, wherein the type of the part of the object is detected by using a plurality of detectors.

6. A control method of a detection device, comprising:
one or more processors; and
one or more memories storing executable instructions which, when executed by the one or more processors, cause the detection device to perform operations including:
detecting an object contained in an image;
specifying which type of a part of the detected object is detected or undetected;
determining whether or not the detected object is a person in a vehicle or a pedestrian in accordance with a combination of the specified types of a detected part and an undetected part; and
if a type of the detected parts of the object includes a predetermined type, determining that the detected object is a pedestrian.

7. A non-transitory computer-readable recording medium storing a program that causes a computer to function as a detection device comprising:
one or more processors; and
one or more memories storing executable instructions which, when executed by the one or more processors, cause the detection device to perform operations including:
detecting an object contained in an image;
specifying which type of a part of the detected object is detected or undetected;
determining whether or not the detected object is a person in a vehicle in accordance with a combination of the specified type of a detected part and an undetected part; and
if a type of the detected parts of the object includes a predetermined type, determining that the detected object is a pedestrian.

8. The device according to claim 1, wherein the operations further include:
- determining that the object has intruded into a preset area of the image; and
- outputting a notification when the detected object who is determined as a pedestrian has intruded into the preset area of the image.

9. The device according to claim 1, wherein the operations further include:
- detecting a vehicle in the image; and
- determining, based on positions of the object and the detected vehicle, not to notify that the object concerning to the detected vehicle has intruded into a preset area.

10. The device according to claim 1, wherein the object is determined as a pedestrian when the detected part of the object is a part of a whole body or a lower body.

11. The device according to claim 1, wherein the object is determined as a person in a vehicle when the detected part of the object includes a face or part of an upper body and does not include any part of a lower body.

12. The device according to claim 2, wherein
- if a combination of detected parts includes a part of a whole body or a lower body, the object is determined as a pedestrian and thereby it is notified that the object has intruded into the preset area, and
- if the combination of the detected parts only includes a face or a part of an upper body, the object is determined as a person in a vehicle who can intrude into the preset area.

* * * * *